Feb. 19, 1929.
E. S. DOCKERY
WINDSHIELD SCREEN
Filed Nov. 7, 1927
1,702,963
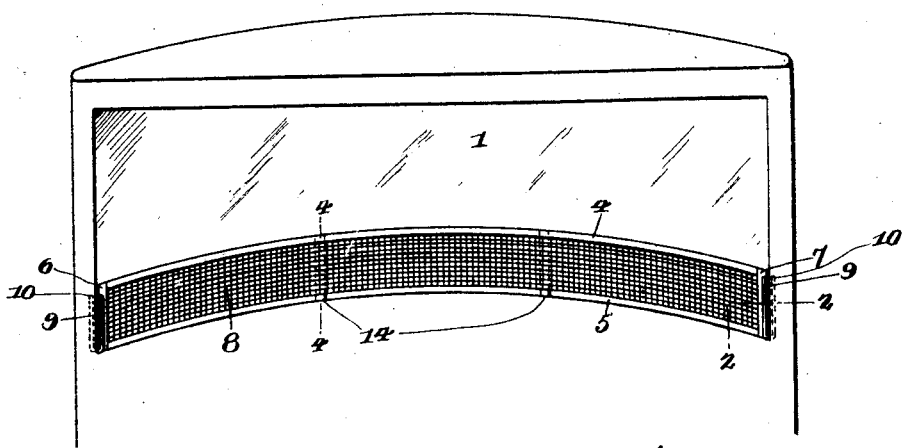
INVENTOR.
Elanna Streeter Dockery
BY
Geo. S. Kimmel
ATTORNEY.

Patented Feb. 19, 1929.

1,702,963

UNITED STATES PATENT OFFICE.

ELANNA STREETER DOCKERY, OF WACO, TEXAS.

WINDSHIELD SCREEN.

Application filed November 7, 1927. Serial No. 231,678.

This invention relates to a screen attachment for the windshields of motor vehicles, and has for its object to provide, in a manner as hereinafter set forth, an attachment of such class to arrest the entrance of foreign bodies, such as bees, bugs, insects, gravel, etc., to the interior of the car when the windshield is elevated for ventilating purposes or for the admission of air, and further whereby the attachment, when the windshield is open, will prevent any annoyance to the driver by arresting the entrance of foreign bodies into the car under such conditions reducing accidents to a minimum.

Further objects of the invention are to provide, in a manner as hereinafter set forth, a screen attachment for windshields of motor vehicles and which is simple in its construction and arrangement, strong, durable, compact, thoroughly efficient in its use, having a sliding snug connection with the windshield, thoroughly efficient in its use, readily installed with respect to the windshield and comparatively inexpensive to manufacture.

With the foregoing and other objects in view the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

Figure 1 is a front elevation of the windshield of a motor vehicle showing the adaptation therewith of a screen attachment in accordance with this invention.

Figure 2 is a section on line 2—2 Figure 1.

Figure 3 is a fragmentary view in perspective of a screen attachment in accordance with this invention showing the adaptation thereof with respect to a windshield.

Figure 4 is a section on line 4—4 Figure 1.

Figure 5 is a perspective view of one of the fastener attachments for maintaining the windshield in a close sliding fit with the screen attachment.

Referring to the drawings in detail 1 denotes a windshield traveling in guide grooves 2 formed in the body 3 of the vehicle or windshield support.

A screen attachment, in accordance with this invention, for windshields will conform in contour to that of the windshield and said attachment comprises a frame formed of a top member 4, a bottom member 5, and a pair of end members 6, 7. Secured within the frame and extending across the opening formed thereby is a foraminous member or screen 8. The members 4 and 5 are of a length slightly less than the length of the windshield and the members 6, 7 are of materially less height than the length of the members 4, 5. The frame in connection with the foraminous panel 8 provides a screen element.

Associated with each end of the screen element is an attaching member therefor and which couples it to the body 3 of the vehicle in a position to be arranged between the opposed grooves 2, 3 in which the windshield 1 slides. Each attachment member is formed from a single length of wire and comprises a pair of vertical legs 9, 10 which are offset with respect to each other and not in parallelism. The leg 9 at its lower end terminates into an outwardly disposed right angular bend 11, which merges into an inwardly disposed right angular bend 12 and the latter terminates in an outwardly disposed right angular bend 13 which terminates in the bottom of the leg 10. Each attaching member snugly grips the outer face of the screen element at an end thereof, see Figures 2 and 3, and the bend 13, and leg 10 are secured in a groove 2 by the windshield 1 as the latter, in connection with a side wall of a groove 2, maintains what may be termed the inner portion of the attaching member in position.

Secured to the screen element and bearing against the windshield are a pair of pressure exerting members which act to maintain the windshield in a close sliding fit with respect to the rear face of the screen element and in this connection see Figure 4. The pressure exerting means is positioned at a point between the vertical median of the screen element and one end thereof and between the vertical median of said element and the other end thereof. Each of said pressure exerting means is formed from a scrap of spring steel bent to provide a yoke-shaped lower portion 14, a rearwardly extending loop-shaped portion 15 and a vertically extending arm 16. The outer end of the yoke-shaped portion 14 is of greater height than the inner arm thereof and the latter terminates in the lower part of the loop-shaped portion 15, and the upper part of the latter terminates in the lower end of the vertical arm 16. The outer arm of the yoke-shaped portion 14 is fixedly secured in any suitable manner to the screen element, preferably it is soldered to the screen element. The windshield 1 is interposed between the arm 16 and the screen element and said arm 16 acts to force the windshield 1 against the screen element and in this connection see Figure 4. The loop-shaped portion 15 extends into the ventilator 17 of the vehicle.

The attachment members provide means for expeditiously connecting the screen element in position, with respect to the windshield, and each pressure exerting element or means provides for a snug sliding fit between the windshield and the screen element so that foreign substances cannot pass downwardly between the forward face of the windshield and the rear face of the screen element.

It is thought the many advantages of a screen attachment, in accordance with this invention, and for the purpose set forth, can be readily understood, and although the preferred embodiment of the invention is as illustrated and described, yet it is to be understood that changes in the details of construction can be had which will fall within the scope of the invention as claimed.

What I claim is:

1. A screen attachment for the vertically shiftable windshields of motor vehicles comprising a screen element, resilient attaching members for securing said element against the lower portion of the windshield, each of said elements having a part thereof overlapping the front of said screen element and another part extending into a guide groove for the windshield and interposed between the latter and a wall of the groove, and pressure exerting elements fixedly secured to the front of the screen element, extending below the bottom thereof and further opposing and bearing against the rear face of the windshield for maintaining it in snug sliding fit with respect to the rear of the screen element.

2. A screen attachment for the vertically shiftable windshields of motor vehicles comprising a screen element, resilient attachment members overlapping the ends of said screen element at the front thereof for maintaining the latter in position against the lower portion of the windshield, each of said elements having a part thereof extending into a guide groove for the windshield and interposed between the latter and a wall of the groove, spaced pressure exerting elements fixedly secured at their lower portions to the front of said screen element and further having their upper portions bearing against the rear of the windshield for maintaining the latter in snug sliding engagement with the rear of said screen element, and each of said pressure exerting elements provided intermediate its ends with a spring loop for extension into the ventilator of the vehicle.

In testimony whereof, I affix my signature hereto.

ELANNA STREETER DOCKERY.